(12) United States Patent
Morgan et al.

(10) Patent No.: US 10,604,674 B2
(45) Date of Patent: Mar. 31, 2020

(54) CATIONIC-STABILIZED DISPERSIONS, HYBRIDIZED CATIONIC-STABILIZED DISPERSIONS, IN-MOLD COATED ARTICLES PREPARED UTILIZING SUCH STABILIZED DISPERSIONS, AND METHODS FOR MANUFACTURING SAME

(71) Applicants: Paul Morgan, Evansville, IN (US); Brodie Wright, Evansville, IN (US)

(72) Inventors: Paul Morgan, Evansville, IN (US); Brodie Wright, Evansville, IN (US)

(73) Assignee: Red Spot Paint & Varnish Co., Inc., Evansville, IN (US)

( * ) Notice: Subject to any disclaimer, the term of this patent is extended or adjusted under 35 U.S.C. 154(b) by 0 days.

(21) Appl. No.: 16/290,069

(22) Filed: Mar. 1, 2019

(65) Prior Publication Data

US 2019/0264063 A1    Aug. 29, 2019

Related U.S. Application Data

(63) Continuation of application No. 15/644,742, filed on Jul. 8, 2017, now Pat. No. 10,227,503, which is a continuation of application No. 14/833,416, filed on Aug. 24, 2015, now Pat. No. 9,738,812.

(51) Int. Cl.
| | | |
|---|---|---|
| *C09D 171/00* | (2006.01) |
| *C09D 175/04* | (2006.01) |
| *C09D 133/08* | (2006.01) |
| *C09D 179/02* | (2006.01) |
| *C09D 133/26* | (2006.01) |
| *C09D 105/00* | (2006.01) |
| *C09D 139/02* | (2006.01) |
| *C08G 18/08* | (2006.01) |

(52) U.S. Cl.
CPC ....... *C09D 175/04* (2013.01); *C08G 18/0814* (2013.01); *C09D 105/00* (2013.01); *C09D 133/08* (2013.01); *C09D 133/26* (2013.01); *C09D 139/02* (2013.01); *C09D 179/02* (2013.01); *C08L 2201/54* (2013.01)

(58) Field of Classification Search
None
See application file for complete search history.

(56) References Cited

U.S. PATENT DOCUMENTS

| | | |
|---|---|---|
| 3,248,467 A | 4/1966 | Gehr |
| 4,830,803 A | 5/1989 | Matsumaru et al. |
| 4,902,578 A | 2/1990 | Kerr, III |
| 5,043,381 A | 8/1991 | Coogan et al. |
| 5,242,738 A | 9/1993 | Furuya et al. |
| 5,411,688 A | 5/1995 | Morrison et al. |
| 5,418,032 A | 5/1995 | Martin |
| 5,523,344 A | 6/1996 | Maksymkiw et al. |
| 5,662,996 A | 9/1997 | Jourquin et al. |
| 5,696,291 A | 12/1997 | Bechara et al. |
| 5,700,867 A | 12/1997 | Ishiyama et al. |
| 5,723,518 A | 3/1998 | Kahl et al. |
| 5,807,919 A | 9/1998 | Duan et al. |
| 5,906,788 A | 5/1999 | Boeckler |
| 6,017,998 A | 1/2000 | Duan et al. |
| 6,339,125 B1 | 1/2002 | Bechara et al. |
| 6,656,596 B1 | 12/2003 | Gardner, Jr. |
| 6,893,595 B1 | 5/2005 | Muir et al. |
| 7,964,665 B2 | 6/2011 | Nagao et al. |
| 8,481,648 B2 | 7/2013 | Schorm et al. |
| 9,169,345 B2 | 10/2015 | Morgan et al. |
| 9,458,321 B2 | 10/2016 | Silver et al. |
| 9,738,812 B2 | 8/2017 | Morgan et al. |
| 10,227,503 B2 | 3/2019 | Morgan et al. |
| 2003/0104168 A1 | 6/2003 | Shane |
| 2005/0182187 A1 | 8/2005 | Koonce |
| 2009/0105411 A1 | 4/2009 | Erdem |
| 2012/0157612 A1* | 6/2012 | Morgan ............ C08G 18/6216 524/560 |

FOREIGN PATENT DOCUMENTS

| | | |
|---|---|---|
| EP | 2 221 044 | 8/2010 |
| WO | WO 99/61216 | 12/1999 |
| WO | WO 2014/004771 | 1/2014 |
| WO | WO-2014004771 A1 * | 1/2014 |

OTHER PUBLICATIONS

Lui, Juan et al. "Aqueous Dispersion Polymerization of Acrylamide in Ammonium Chloride Solution with Water-soluble Chitosan as a Stabilizer." Iranian Polymer Journal 20 (11), 2011, 887-896.

Jaejung, Park et al., "Aggregation Processes of a Weak Polyelectrolyte, Poly(allyamine) Hydrochloride." Bulletin Korean Chem. Soc. 2008, vol. 29, No. 1.

* cited by examiner

*Primary Examiner* — Vu A Nguyen

(74) *Attorney, Agent, or Firm* — King & Partners, PLC

(57) ABSTRACT

A cationic-stabilized dispersion for use in fabricating an in-mold coated article including at least one of a cationic-stabilized polyurethane dispersion, a cationic-stabilized acrylic dispersion, a cationic-stabilized polyacrylamide dispersion, a cationic-stabilized polyallylamine dispersion, a cationic-stabilized polyetheramine dispersion, and a cationic-stabilized chitosan dispersion.

6 Claims, No Drawings

CATIONIC-STABILIZED DISPERSIONS, HYBRIDIZED CATIONIC-STABILIZED DISPERSIONS, IN-MOLD COATED ARTICLES PREPARED UTILIZING SUCH STABILIZED DISPERSIONS, AND METHODS FOR MANUFACTURING SAME

CROSS-REFERENCE TO RELATED APPLICATIONS

This application is a continuation of U.S. application Ser. No. 15/644,742, entitled "CATIONIC-STABILIZED DISPERSIONS, HYBRIDIZED CATIONIC-STABILIZED DISPERSIONS, IN-MOLD COATED ARTICLES PREPARED UTILIZING SUCH STABILIZED DISPERSIONS, AND METHODS FOR MANUFACTURING SAME," filed Jul. 8, 2017, which is a continuation of U.S. application Ser. No. 14/833,416, entitled "CATIONIC-STABILIZED DISPERSIONS, HYBRIDIZED CATIONIC-STABILIZED DISPERSIONS, IN-MOLD COATED ARTICLES PREPARED UTILIZING SUCH STABILIZED DISPERSIONS, AND METHODS FOR MANUFACTURING SAME," filed Aug. 24, 2015, now U.S. Pat. No. 9,738,812—which are hereby incorporated herein by reference in their entirety, including all references cited therein.

BACKGROUND OF THE INVENTION

1. Field of the Invention

The present invention relates in general to cationic-stabilized dispersions, such as, for example, cationic-stabilized polyurethane dispersions, cationic-stabilized acrylic dispersions, cationic-stabilized polyacrylamide dispersions, cationic-stabilized polyallylamine dispersions, cationic-stabilized polyetheramine dispersions, and cationic-stabilized chitosan dispersions. The present invention further relates to cationic-stabilized dispersions hybridized with nonionic compounds, including non-polymeric, oligomeric, and polymeric resins—just to name a few. In addition, the present invention relates to in-mold coated articles prepared utilizing such cationic-stabilized dispersions optionally hybridized with nonionic compounds. Such in-mold coated articles are suitable for use in, for example, residential, commercial, industrial, and/or military products in any one of a number of industries, including, but not limited to, aerospace, automotive, construction, furniture, health care, and/or marine industries—just to name a few.

2. Background Art

Cationic dispersions have been known in the field of chemistry for years. See, for example, U.S. Pat. No. 6,339,125 entitled "Cationic Polyurethane Dispersion and Composition Containing Same," U.S. Pat. No. 6,017,998 entitled "Stable Aqueous Polyurethane Dispersions," U.S. Pat. No. 5,807,919 entitled "Water-Based Sulfonated Polymer Compositions," U.S. Pat. No. 5,723,518 entitled "Aqueous Two-Component Polyurethane Coating Compositions and a Method for Their Preparation," U.S. Pat. No. 5,700,867 entitled "Aqueous Dispersion of an Aqueous Hydrazine-Terminated Polyurethane," U.S. Pat. No. 5,696,291 entitled "Cationic Polyurethane Compositions, Quaternary Ammonium Salts and Methods for Their Preparation," U.S. Pat. No. 5,523,344 entitled "Water-Based Adhesive Formulation Having Enhanced Characteristics," U.S. Pat. No. 5,043,381 entitled "Aqueous Dispersions of a Nonionic, Water Dispersible Polyurethane Having Pendent Polyoxyethylene Chains," U.S. Pat. No. 7,964,665 entitled "Cationic Polyurethane Resin Aqueous Dispersion, Ink-Jet Recording Medium Using The Same," U.S. Patent Application Publication No. 2009/0105411 A1 entitled "Aqueous Non-Ionic Hydrophilic Polyurethane Dispersions, and a Continuous Process of Making the Same," and U.S. Patent Application Publication No. 2005/0182187 A1 entitled "Polyurethane Dispersions and Coatings Made Therefrom"—all of which are hereby incorporated herein by reference in their entirety—including all references cited therein.

Furthermore, in-mold coated articles have been known in the art for several years. See, for example, U.S. Pat. No. 6,656,596 entitled "Decorative Automotive Interior Trim Articles with Cast Integral Light Stable Covering and Process for Making the Same," U.S. Pat. No. 5,906,788 entitled "Dual Cure, In-Mold Process for Manufacturing Abrasion Resistant, Coated Thermoplastic Articles," U.S. Pat. No. 5,662,996 entitled "Method for Manufacturing Self-Supporting Synthetic Trim Parts and Thus Manufactured Trim Parts," U.S. Pat. No. 5,418,032 entitled "Vehicle Interior Door Panel," U.S. Pat. No. 5,411,688 entitled "Method for Forming Plastic Molded Panels with Inserts," U.S. Pat. No. 5,242,738 entitled "Surface Layer of Interior Article," U.S. Pat. No. 4,902,578 entitled "Radiation-Curable Coating for Thermoplastic Substrates," U.S. Pat. No. 4,830,803 entitled "Method of Making a Molded Article of Methacrylic Resin," U.S. Pat. No. 3,248,467 entitled "Molding Process," U.S. Patent Application Publication No. 2003/0104168 A1 entitled "In-Mold-Coated Automotive Interior and Other Products, and Methods for Manufacturing Same," European Patent Application No. 1,079,962 B1 entitled "Decorative Automotive Interior Trim Articles with Integral In-Mold Coated Polyurethane Aromatic Elastomer Covering and Process for Making the Same," and International Publication No. WO 99/61216 entitled "Decorative Automotive Interior Trim Articles with Integral In-Mold Coated Polyurethane Aromatic Elastomer Covering and Process for Making the Same," all of which are hereby incorporated herein by reference in their entirety—including all references cited therein.

While the utilization of in-mold coated articles has become increasingly popular in several industries, to the best of Applicant's knowledge, cationic-stabilized dispersions optionally hybridized with nonionic compounds and certain embodiments thereof, have not been used to provide soft feeling and robust in-mold coated articles that process well. Indeed, historically the field of in-mold coatings for polyurethane substrates, and other substrates, has been dominated by waterborne coatings that are anionically (containing carboxyl functionality neutralized with an amine and stable at basic pH or non-ionically (pH-independent hydrophilic groups in the backbone) stabilized.

It is therefore an object of the present invention, among other objects, to provide novel, soft feeling and robust in-mold coated articles that are prepared utilizing cationic-stabilized dispersions and hybridized variants thereof. It is also an object of the present invention to provide methods for manufacturing such novel in-mold articles in a repeatable manner.

These and other features, advantages, and objects of the present invention will be further understood and appreciated by those skilled in the art by reference to the following specification, claims, chemical structures, and any appended drawings.

SUMMARY OF THE INVENTION

The present invention is directed to a cationic-stabilized dispersion for use in fabricating an in-mold coated article comprising: one or more of a cationic-stabilized polyurethane dispersion, a cationic-stabilized acrylic dispersion, a cationic-stabilized polyacrylamide dispersion, a cationic-stabilized polyallylamine dispersion, a cationic-stabilized polyetheramine dispersion, and a cationic-stabilized chitosan dispersion.

In a preferred embodiment of the present invention, the cationic-stabilized dispersion preferably comprises a cationic-stabilized polyurethane dispersion. In this embodiment, the cationic-stabilized polyurethane dispersion preferably comprises an aliphatic polyurethane dispersion and/or a cationic-stabilized polyurethane dispersion that is void of free isocyanate.

In another preferred embodiment of the present invention, the cationic-stabilized polyurethane dispersion comprises a cationic polyurethane resin aqueous dispersion, wherein a cationic polyurethane resin including a structural unit represented by structure (I) is dispersed in an aqueous medium, and the content of a cationic amino group of the structural unit in the cationic polyurethane resin is approximately 0.005 to approximately 1.5 equivalents/kg:

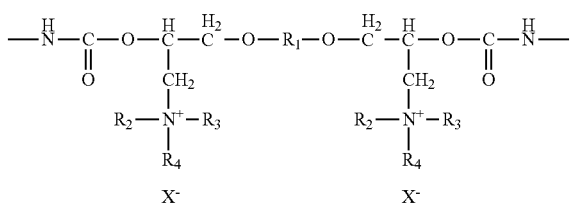

(I)

wherein $R_1$ comprises an alkylene group which may include an alicyclic structure, a residue of bivalent phenol, or a polyoxyalkylene group, wherein $R_2$ and $R_3$ each independently comprise an alkyl group which may include an alicyclic structure, and $R_4$ comprises a hydrogen atom or a residue of a quaternizing agent which is introduced by a quaternizing reaction and $X^-$ represents an anionic counter ion.

In yet another preferred embodiment of the present invention, the cationic-stabilized dispersion comprises a cationic-stabilized polyurethane dispersion having approximately 10 to approximately 60 percent solids, a Tg of approximately −40 degrees centigrade to approximately 20 degrees centigrade, and volatile organic content of less than approximately 10 parts per million.

In another aspect of the present invention, the cationic-stabilized dispersion comprises a cationic-stabilized polymeric acrylic dispersion. Preferably, the cationic-stabilized polymeric acrylic dispersion comprises a hydroxyl functional cationic acrylic copolymer that crosslinks with polyisocyanates and epoxy silanes at ambient temperatures.

In a preferred embodiment of the present invention, the cationic-stabilized polymeric acrylic dispersion comprises at least one of an ethylene acrylic acid copolymer and a styrene-acrylic copolymer.

In another preferred embodiment of the present invention, the cationic-stabilized dispersion comprises a cationic-stabilized polymeric acrylic dispersion having approximately 10 to approximately 60 percent solids, a Tg of approximately 15 degrees centigrade to approximately 50 degrees centigrade, and a viscosity ranging from approximately 200 centipoise to approximately 800 centipoise at 25 degrees centigrade.

In yet another aspect of the present invention, the cationic-stabilized dispersion preferably comprises a cationic-stabilized polyetheramine dispersion.

In a preferred embodiment of the present invention, the cationic-stabilized dispersion comprises one or more of a tri-functional primary amine, a di-functional primary amine, and/or a di-functional secondary amine.

In one embodiment of the present invention, the cationic-stabilized polyetheramine dispersion comprises the structure of formula II:

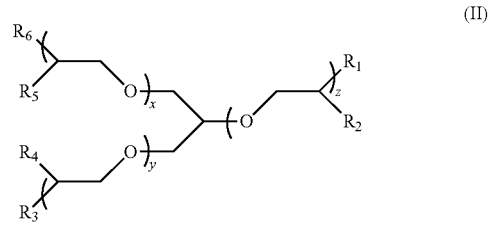

(II)

wherein $R_1$-$R_6$ are each independently selected from the group consisting of H, an amine, an ammonium constituent, and an alkyl, cycloalkyl, polycycloalkyl, heterocycloalkyl, aryl, alkaryl, aralkyl, alkoxy, alkanoyl, aroyl, and/or alkylalkenyl group containing approximately 1 to approximately 25 carbon atom(s), with the proviso that at least three of $R_1$-$R_6$ consist of an amine or an ammonium constituent and at least one of $R_1$-$R_6$ consists of an ammonium constituent under acidic conditions, and wherein the sum of x, y, and z ranges from approximately 50 to approximately 90.

In another embodiment of the present invention, the cationic-stabilized polyetheramine dispersion comprises the structure of formula III:

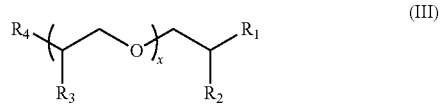

(III)

wherein $R_1$-$R_4$ are each independently selected from the group consisting of H, an amine, an ammonium constituent, and an alkyl, cycloalkyl, polycycloalkyl, heterocycloalkyl, aryl, alkaryl, aralkyl, alkoxy, alkanoyl, aroyl, and/or alkylalkenyl group containing approximately 1 to approximately 25 carbon atom(s), with the proviso that at least two of $R_1$-$R_4$ consist of an amine or an ammonium constituent and at least one of $R_1$-$R_4$ consists of an ammonium constituent under acidic conditions, and wherein x ranges from approximately 5 to approximately 70.

In a preferred embodiment of the present invention, the cationic-stabilized polyetheramine dispersion comprises a total amine concentration of approximately 0.40 meq/g to approximately 0.98 meq/g.

In another aspect of the present invention, the cationic-stabilized dispersion comprises a cationic-stabilized polyacrylamide dispersion, a cationic-stabilized polyallylamine dispersion and/or a cationic-stabilized chitosan dispersion.

The present invention is also directed to a hybridized cationic-stabilized dispersion for use in fabricating an in-mold coated article comprising: one or more of a cationic-stabilized polyurethane dispersion, a cationic-stabilized acrylic dispersion, a cationic-stabilized polyacrylamide dispersion, a cationic-stabilized polyallylamine dispersion, a cationic-stabilized polyetheramine dispersion, and a cationic-stabilized chitosan dispersion, wherein the cationic-stabilized dispersion is hybridized with at least one of nonionic, oligomeric resins and nonionic, polymeric resins.

The present invention is further directed to an in-mold coated article comprising: an inner surface and an outer surface, characterized in that the in-mold coated article is prepared in association with a cationic-stabilized dispersion. In this embodiment, the cationic-stabilized dispersion comprises one or more of a cationic-stabilized polyurethane dispersion, a cationic-stabilized acrylic dispersion, a cationic-stabilized polyacrylamide dispersion, a cationic-stabilized polyallylamine dispersion, a cationic-stabilized polyetheramine dispersion, and/or a cationic-stabilized chitosan dispersion.

The present invention is also directed to a method for manufacturing an in-mold coated article comprising the steps of: (a) optionally applying a mold release agent to at least a portion of a tool surface; (b) applying a cationic-stabilized dispersion to at least a portion of the tool surface and/or the mold release agent; and (c) associating a substrate with the tool surface having the optional mold release agent and the cationic-stabilized dispersion to, in turn, generate an in-mold coated article.

DETAILED DESCRIPTION OF THE INVENTION

While this invention is susceptible of embodiment in many different forms, there is described herein in detail several specific embodiments with the understanding that the present disclosure is to be considered as an exemplification of the principles of the invention and is not intended to limit the invention to the embodiments illustrated.

In accordance with the present invention, in-mold coated articles are disclosed herein which are prepared utilizing cationic-stabilized dispersions and cationic-stabilized dispersions hybridized with nonionic compounds. The articles are preferably fabricated from, for example, polyurethane (e.g., sprayskin, foam, RIM, slush TPU), vinyl (e.g., slush vinyl), thermoplastic polyolefins, elastomers, among others.

In further accordance with the present invention, the cationic-stabilized dispersions preferably comprise cationic-stabilized polyurethane dispersions, cationic-stabilized acrylic dispersions, cationic-stabilized polyacrylamide dispersions, cationic-stabilized polyallylamine dispersions, cationic-stabilized polyetheramine dispersions, and/or cationic-stabilized chitosan dispersions. The dispersions of the present invention may be hybridized with nonionic compounds, including, for example, non-polymeric, oligomeric, and polymeric resins.

The novel dispersion coatings disclosed herein are characterized by the cationic nature of the aqueous or waterborne resin(s) being used. In one embodiment, the cationic resins are characterized by amine functionality on the backbone and, as such, are stable aqueous dispersions at generally alkaline or basic pHs. The amine functionality on the backbone of these resins affords excellent adhesion to, for example, a polyurethane article which is placed in the mold following the coating application. Such improved adhesion provides the ability to process over a wide range of substrates at varying NCO/OH ratios. Further benefits are extremely fast dry times, near zero-VOC emission, as well as the ability to be cross-linked at the amine sites for improved physical properties.

Without being bound by any one particular theory, it is believed that, in one embodiment, when the dispersion coating is sprayed into the mold, one or more amine functional groups or moieties become available as an acid (typically glacial acetic acid or formic acid). Such amine groups interact in a plurality of ways with the substrate (e.g., polyurethane) which is subsequently applied to the mold. In the case of primary and secondary amine functionality, active hydrogens available on the coating backbone are believed to allow for a thermodynamically favored reaction site with the isocyanate portion of the polyurethane material placed in the mold after the coating. The controlled, yet rapid formation of covalent bonds due to amine-isocyanate reactions is believed to provide for enhanced adhesion and exemplary processing. In the case of tertiary amines and quaternary ammonium salts, the amines may associate themselves with the polyurethane applied to the mold in the form of accelerators for the isocyanate-polyol reaction of the polyurethane substrate.

Notwithstanding the foregoing and regardless of the precise mechanism, one unexpected advantage of the cationic nature of the dispersion/coating is a more robust in-mold product which is capable of being applied over a wider range of polyurethane substrates utilizing varying NCO/OH ratios and catalyst packages. An additional advantage of the cationic system is the potential availability of free hydrogens via amine groups (once the acid evaporates after application) for reaction with crosslinkers, including epoxy-functional silanes, polyisocyanates, water-reducible epoxy prepolymers, etcetera. One benefit of the added crosslinker is to readily modify (e.g., increase or decrease) any particular desirable property (e.g., chemical resistance, abrasion resistance, water resistance, toughness, etcetera).

In a first embodiment of the present invention, the cationic-stabilized dispersion preferably comprises one or more cationic-stabilized polymeric acrylic dispersions. Suitable examples include Ottopol K-12, Ottopol K-21-30, Ottopol K-362, Ottopol K-633, Ottopol K-23, Ottopol K-65, Ottopol K-66, and Ottopol KX-99 which are commercially available from Gellner Industrial, LLC, Michem Emulsion 09625 which is commercially available from Michelman, Syntran 6301, Syntran 6302, and Syntran FX30-20 which are commercially available from Interpolymer Corporation, Picassian AC-146 which is commercially available from Stahl USA, and Acrit UW-550CS which is commercially available from Taisei Chemical Industries, Ltd.

In accordance with the present invention, the cationic-stabilized acrylic dispersions preferably comprise a hydroxyl functional cationic acrylic copolymer that cross-links with polyisocyanates and epoxy silanes at ambient temperatures. Additionally, the cationic-stabilized acrylic dispersions may also comprise cationic acrylic copolymers, such as an ethylene acrylic acid copolymer and/or a styrene-acrylic copolymer.

In one embodiment of the present invention, the cationic-stabilized polymeric acrylic dispersions themselves preferably comprise approximately 10 to approximately 60 percent solids, and more preferably comprise approximately 20 to approximately 50 percent solids, and yet more preferably comprise approximately 25 to approximately 45 percent solids.

Additionally, the cationic-stabilized polymeric acrylic dispersions of the present invention preferably comprise a Tg of approximately 0 degrees centigrade to approximately 90 degrees centigrade, and more preferably comprise a Tg of approximately 15 degrees centigrade to approximately 50 degrees centigrade, and yet more preferably comprise a Tg of approximately 20 degrees centigrade to approximately 45 degrees centigrade.

Preferably, the viscosity of the cationic-stabilized polymeric acrylic dispersions themselves range from approximately 50 centipoise to approximately 5,000 centipoise at 25 degrees centigrade, and more preferably range from approximately 100 centipoise to approximately 2,000 centipoise at 25 degrees centigrade, and yet more preferably range from approximately 200 centipoise to approximately 800 centipoise at 25 degrees centigrade.

In one embodiment of the present invention, the concentration of the cationic-stabilized polymeric acrylic dispersion in a net or overall formulation preferably ranges from approximately 20 percent by weight to approximately 95 percent by weight, and more preferably ranges from approximately 40 percent by weight to approximately 90 percent by weight, and yet more preferably ranges from approximately 50 percent by weight to approximately 85 percent by weight.

While specific cationic-stabilized polymeric acrylic dispersions have been disclosed, for illustrative purposes only, it will be understood that numerous other cationic-stabilized polymeric acrylic dispersions are likewise contemplated for use—so long as they operate effectively in their conditions of intended use.

In a second embodiment of the present invention, the cationic-stabilized dispersions preferably comprise one or more cationic-stabilized polyurethane dispersions. Suitable examples include Hydran CP-7010, Hydran CP-7040, and Hydran CP-7050 which are commercially available from DIC Corporation, Picassian PU-685 which is commercially available from Stahl USA, Superflex 620 and Superflex 650 which are commercially available from DAI-ICHI KOGYO SEIYAKU Co. Ltd., and Witcobond 213 and Witcobond 781 which are commercially available from Chemtura Corporation.

In one embodiment of the present invention, the cationic-stabilized polyurethane dispersions preferably comprise aliphatic polyurethane dispersions and/or polyurethane dispersions that are void of or essentially void of free isocyanate.

In accordance with the present invention, the cationic-stabilized polyurethane dispersions preferably comprise a cationic polyurethane resin aqueous dispersion wherein a cationic polyurethane resin including a structural unit represented by structure (I) is dispersed in an aqueous medium, and the content of a cationic amino group of the structural unit in the cationic polyurethane resin is preferably 0.005 to 1.5 equivalents/kg, and more preferably 0.01 to 1.0 equivalents/kg, and yet more preferably 0.02 to 0.5 equivalents/kg:

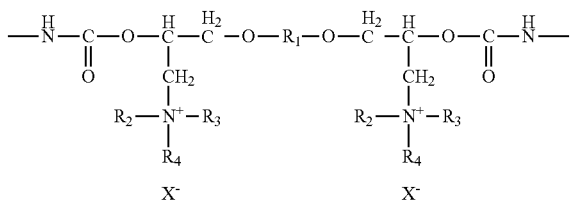

(I)

wherein $R_1$ comprises an alkylene group which may include an alicyclic structure, a residue of bivalent phenol, or polyoxyalkylene group, wherein $R_2$ and $R_3$ each independently comprise an alkyl group which may include an alicyclic structure, and $R_4$ comprises a hydrogen atom or a residue of the quaternizing agent which is introduced by the quaternizing reaction and $X^-$ comprises an anionic counter ion. Syntheses for these cationic-stabilized polyurethane dispersions are provided in PCT Pub. No. PCT/JP2005/011736 and its related applications.

In a preferred embodiment of the present invention the cationic-stabilized polyurethane dispersions themselves comprise approximately 10 to approximately 60 percent solids, and more preferably comprise approximately 20 to approximately 50 percent solids, and yet more preferably comprise approximately 25 to approximately 45 percent solids.

Additionally, the cationic-stabilized polyurethane dispersions of the present invention preferably comprise a Tg of approximately −60 degrees centigrade to approximately 90 degrees centigrade, and more preferably comprise a Tg of approximately −40 degrees centigrade to approximately 20 degrees centigrade, and yet more preferably comprise a Tg of approximately −40 degrees centigrade to approximately 0 degrees centigrade.

In another embodiment of the present invention, the volatile organic content of the cationic-stabilized polyurethane dispersions themselves is less than approximately 20 parts per million, and more preferably less than approximately 10 parts per million, and yet more preferably less than approximately 7.5 parts per million.

Preferably, the concentration of the cationic-stabilized polyurethane dispersion in a net or overall formulation ranges from approximately 20 percent by weight to approximately 98 percent by weight, and more preferably ranges from approximately 60 percent by weight to approximately 95 percent by weight, and yet more preferably ranges from approximately 75 percent by weight to approximately 93 percent by weight.

While specific cationic-stabilized polyurethane dispersions have been disclosed, for illustrative purposes only, it will be understood that numerous other cationic-stabilized polyurethane dispersions are likewise contemplated for use—so long as they operate effectively in their conditions of intended use.

In a third embodiment of the present invention, the cationic-stabilized dispersions preferably comprise one or more cationic-stabilized polyetheramine dispersions. Suitable examples include Jeffamine T400, Jeffamine SD-2001, Jeffamine D-2000, Jeffamine T-3000, Jeffamine D-4000, and Jeffamine T-5000 which are commercially available from Huntsman Corporation, Baxxodur EC 311 and Baxxodur EC 303 which are commercially available from BASF, and Poly A27-2000 and Poly A37-5000 which are commercially available from Arch Chemical Inc.

In accordance with the present invention, the cationic-stabilized polyetheramine dispersions preferably comprise multi-functional primary, secondary, and tertiary, amines, including, but not limited to, tri-functional primary amines, di-functional primary amines, di-functional secondary amines—just to name a few.

The present invention is also directed to cationic-stabilized polyetheramine dispersions which comprise the structure of formula II:

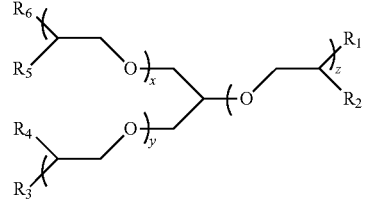

(II)

wherein $R_1$-$R_6$ are each independently selected from the group consisting of H, an amine, an ammonium constituent, and an alkyl, cycloalkyl, polycycloalkyl, heterocycloalkyl, aryl, alkaryl, aralkyl, alkoxy, alkanoyl, aroyl, and/or alkyl-alkenyl group containing approximately 1 to approximately 25 carbon atom(s), with the proviso that at least three of $R_1$-$R_6$ consist of an amine or an ammonium constituent and at least one of $R_1$-$R_6$ consists of an ammonium constituent under acidic conditions, and wherein the sum of x, y, and z ranges from approximately 50 to approximately 90.

In a preferred embodiment of the present invention, $R_1$, $R_3$, and $R_6$ comprise an amine or ammonium constituent and $R_2$, $R_4$, and $R_5$ comprise a methyl group, and wherein the sum of x, y, and z comprises approximately 85.

The present invention is further directed to cationic-stabilized polyetheramine dispersions which comprise the structure of formula III:

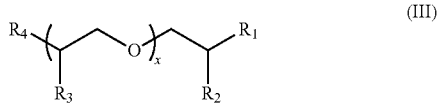

(III)

wherein $R_1$-$R_4$ are each independently selected from the group consisting of H, an amine, an ammonium constituent, and an alkyl, cycloalkyl, polycycloalkyl, heterocycloalkyl, aryl, alkaryl, aralkyl, alkoxy, alkanoyl, aroyl, and/or alkyl-alkenyl group containing approximately 1 to approximately 25 carbon atom(s), with the proviso that at least two of $R_1$-$R_4$ consist of an amine or an ammonium constituent and at least one of $R_1$-$R_4$ consists of an ammonium constituent under acidic conditions, and wherein x ranges from approximately 5 to approximately 70.

In a preferred embodiment of the present invention, $R_1$ and $R_4$ comprise an amine or ammonium constituent and $R_2$ and $R_3$ each comprise a methyl group, and wherein x comprises approximately 6.1 or approximately 68.

It will be understood that the compounds identified supra in structures II and III are available from Huntsman with amine functionality that can be altered via pH modifiers—among others.

In another aspect of the present invention, the cationic-stabilized polyetheramine dispersions comprise a total amine concentration of approximately 0.40 meq/g to approximately 0.98 meq/g, and more preferably comprise a total amine concentration of approximately 0.44 meq/g to approximately 0.90 meq/g, and yet more preferably comprise a total amine concentration of approximately 0.50 meq/g to approximately 0.54 meq/g.

Preferably, the concentration of the cationic-stabilized polyetheramine dispersion in a net or overall formulation ranges from approximately 10 percent by weight to approximately 75 percent by weight, and more preferably ranges from approximately 12 percent by weight to approximately 50 percent by weight, and yet more preferably ranges from approximately 15 percent by weight to approximately 30 percent by weight.

While specific cationic-stabilized polyetheramine dispersions have been disclosed, for illustrative purposes only, it will be understood that numerous other cationic-stabilized polyetheramine dispersions are likewise contemplated for use—so long as they operate effectively in their conditions of intended use.

In another embodiment of the present invention, cationic-stabilized dispersions preferably comprise cationic-stabilized polyacrylamide dispersions (see, for example, Lui, Juan et al., "Aqueous Dispersion Polymerization of Acrylamide in Ammonium Chloride Solution with Water-soluble Chitosan as a Stabilizer." *Iranian Polymer Journal* 20 (11), 2011, 887-896. Print) and/or cationic-stabilized polyallylamine dispersions (see, for example, Jaejung, Park et al., "Aggregation Processes of a Weak Polyelectrolyte, Poly (allylamine) Hydrochloride." *Bull. Korean Chem. Soc.* 2008, Vol. 29, No. 1. Print), and cationic-stabilized chitosan dispersions (see European Patent Publication No. 2 221 044 A1). The three above-identified references are hereby incorporated herein by reference in their entirety—including all references cited therein.

As will be shown in greater detail in the examples infra, the present invention is further directed to cationic-stabilized dispersions hybridized with nonionic compounds, including non-polymeric, oligomeric, and polymeric resins—just to name a few. Preferred, nonionic compounds include, for example, nonionic polyester diols, such as Kuraray P-1010 which is commercially available from Kuraray Co., Ltd., polyethylene glycols, such as Carbowax 200 and Carbowax 400 which are commercially available from Dow Chemical Company, alkoxylated polyols, such as Polyol R3215 and Polyol R3165 which are commercially available from Perstorp Holding AB, ethoxylated pentaerythritols, such as Polyol 4290 and Polyol 4360 which are commercially available from Perstorp Holding AB, ethoxylated Sorbitols, such as Renex S 30 and Ethox 3692 which are commercially available from Croda, non-ionic emulsified polyols, non-ionic diols and multifunctional polyols based on polyesters, polyethers and polyacrylates. Specific examples include Kuraray C-510, Stepanpol PD-195, Chempol 211-2224, etcetera. Examples of non-ionic polyurethane dispersions include Witcobond W-320, W-320, W-322, and Bondthane UD-410. It will be understood that, unless otherwise specified, the chemical compounds provided herein, or their precursors, are available from common commercial chemical vendors, such as Sigma-Aldrich Chemical Co., of St. Louis, Mo.

As will be discussed in greater detail below, the cationic-stabilized dispersion formulations of the present invention preferably include several other chemical compounds including, but not limited to, solvents, co-solvents, surfactants, substrate wetting agents, rheology modifiers, pH modifiers, matting agents, defoaming agents, lubricity modifiers, taber additives, fillers, pigments, color additives, tinting agents—the just to name a few.

One preferred solvent for use in accordance with the present invention includes water that has preferably been distilled, deionized, and/or filtered via reverse osmosis, as well as polar, non-polar, protic, and aprotic solvents. Additional examples of solvents and/or co-solvents include propylene glycol n-butyl ether, propylene glycol monoethyl ether, glygol ether EB, proglyme—just to name a few. Preferably, the concentration of the solvent/co-solvent in a net or overall formulation ranges from approximately 0 percent by weight to approximately 95 percent by weight, and more preferably ranges from approximately 5 percent by weight to approximately 85 percent by weight, and yet more preferably ranges from approximately 10 percent by weight to approximately 75 percent by weight—depending upon the type of cationic-stabilized dispersion.

In certain embodiments of the present invention, an anionic surfactant may be utilized. Suitable examples include taurates; isethionates; alkyl and alkyl ether sulfates; succinamates; alkylaryl sulfonates; olefin sulfonates; alkoxy alkane sulfonates; sodium and potassium salts of fatty acids derived from natural plant or animal sources or synthetically prepared; sodium, potassium, ammonium, and alkylated ammonium salts of alkylated and acylated amino acids and peptides; alkylated sulfoacetates; alkylated sulfosuccinates; acylglyceride sulfonates, alkoxyether sulfonates; phosphoric acid esters; phospholipids; and combinations thereof. Specific anionic surfactants contemplated for use include, but are by no means limited to, ammonium cocoyl isethionate, sodium cocoyl isethionate, sodium lauroyl isethionate, sodium stearoyl isethionate, sodium lauroyl sarcosinate, sodium cocoyl sarcosinate, sodium lauryl sarcosinate, disodium laureth sulfosuccinate, sodium lauryl sulfoacetate, sodium cocoyl glutamate, TEA-cocoyl glutamate, TEA cocoyl alaninate, sodium cocoyl taurate, potassium cetyl phosphate, and combinations thereof.

In certain embodiments of the present invention, one or more cationic surfactants may be utilized. Suitable examples include alkylated quaternary ammonium salts $R_4NX$; alkylated amino-amides $(RCONH-(CH_2)_n)NR_3X$; alkylimidazolines; alkoxylated amines; and combinations thereof. Specific examples of anionic surfactants contemplated for use include, but are by no means limited to, cetyl ammonium chloride, cetyl ammonium bromide, lauryl ammonium chloride, lauryl ammonium bromide, stearyl ammonium chloride, stearyl ammonium bromide, cetyl dimethyl ammonium chloride, cetyl dimethyl ammonium bromide, lauryl dimethyl ammonium chloride, lauryl dimethyl ammonium bromide, stearyl dimethyl ammonium chloride, stearyl dimethyl ammonium bromide, cetyl trimethyl ammonium chloride, cetyl trimethyl ammonium bromide, lauryl trimethyl ammonium chloride, lauryl trimethyl ammonium bromide, stearyl trimethyl ammonium chloride, stearyl trimethyl ammonium bromide, lauryl dimethyl ammonium chloride, stearyl dimethyl cetyl ditallow dimethyl ammonium chloride, dicetyl ammonium chloride, dilauryl ammonium chloride, dilauryl ammonium bromide, distearyl ammonium chloride, distearyl ammonium bromide, dicetyl methyl ammonium chloride, dicetyl methyl ammonium bromide, dilauryl methyl ammonium chloride, distearyl methyl ammonium chloride, distearyl methyl ammonium bromide, ditallow dimethyl ammonium chloride, ditallow dimethyl ammonium sulfate, di(hydrogenated tallow) dimethyl ammonium chloride, di(hydrogenated tallow) dimethyl ammonium acetate, ditallow dipropyl ammonium phosphate, ditallow dimethyl ammonium nitrate, di(coconutalkyl)dimethyl ammonium chloride, di(coconutalkyl)dimethyl ammonium bromide, tallow ammonium chloride, coconut ammonium chloride, stearamidopropyl PG-imonium chloride phosphate, stearamidopropyl ethyldimonium ethosulfate, stearimidopropyldimethyl (myristyl acetate) ammonium chloride, stearamidopropyl dimethyl cetearyl ammonium tosylate, stearamidopropyl dimethyl ammonium chloride, stearamidopropyl dimethyl ammonium lactate, ditallowyl oxyethyl dimethyl ammonium chloride, behenamidopropyl PG dimonium chloride, dilauryl dimethyl ammonium chloride, distearly dimethyl ammonium chloride, dimyristyl dimethyl ammonium chloride, dipalmityl dimethyl ammonium chloride, distearyl dimethyl ammonium chloride, stearamidoproyl PG-dimonium chloride phosphate, stearamidopropyl ethyldiammonium ethosulfate, stearamidopropyl dimethyl (myristyl acetate) ammonium chloride, stearimidopropyl diemthyl cetaryl ammonium tosylate, stearamido propyl dimethyl ammonium chloride, stearamidopropyl dimethyl ammonium lactate, and combinations thereof.

Likewise, any one of a number of commercially available, well-known non-ionic surfactants are contemplated for use, including, but not limited to, alcohols, alkanolamides, amine oxides, esters (including glycerides, ethoxylated glycerides, polyglyceryl esters, sorbitan esters, carbohydrate esters, ethoxylated carboxylic acids, phosphoric acid triesters), ethers (including ethoxylated alcohols, alkyl glucosides, ethoxylated polypropylene oxide ethers, alkylated polyethylene oxides, and alkylated polypropylene oxides, alkylated PEG/PPO copolymers). Specific examples of non-ionic surfactants contemplated for use include, but are by no means limited to, cetearyl alcohol, ceteareth-20, nonoxynol-9, C12-15 pareth-9, POE(4) lauryl ether, cocamide DEA, glycol distearate, glyceryl stearate, PEG-100 stearate, sorbitan stearate, PEG-8 laurate, polyglyceryl-10 trilaurate, lauryl glucoside, octylphenoxy-polyethoxyethanol, PEG-4 laurate, polyglyceryl diisostearate, polysorbate-60, PEG-200 isostearyl palmitate, polysorbate-80, and combinations thereof.

In addition, any one of a number of commercially available, well-known amphoteric surfactants are contemplated for use, including, but not limited to, betaines; sultaines; hydroxysultaines, amido betaines, amidosulfo betaines; and combinations thereof. Specific examples of amphoteric surfactants contemplated for use include, but are by no means limited to, cocoamidopropyl sultaine, cocoamidopropyl hydroxyl sultaine, cocoamidopropylbetaine, coco dimethyl carboxymethyl betaine, lauryl dimethyl carboxymethyl betaine, lauryl dimethyl alphacarboxyethyl betaine, cetyl dimethyl carboxymethyl betaine, cetyl dimethyl betaine, lauryl (2-bishydroxy) carboxymethyl betaine, stearyl bis-(2-hydroxyethyl) carboxymethyl betaine, oelyl dimethyl gamma-carboxypropyl betaine, lauryl bis-(2-hydroxypropyl)alpha carboxymethyl betaine, coco dimethyl sulfopropyl betaine, stearyl dimethyl sulfopropyl betaine, lauryl dimethyl sulfoethyl betaine, lauryl bis(2-hydroxyethyl) sulfopropyl betaine, oleyl betaine, cocamidopropyl betaine, and combinations thereof.

In one or more preferred embodiments of the present invention, the following surfactants were found to be particularly beneficial as substrate wetting agents, namely: Masurf FS-2800 (Mason Chemical Company) Byk-328 (BYK-Chemie), Byk-333 (BYK-Chemie), Byk-346 (BYK-Chemie), Byk-348 (BYK-Chemie), Surfactol 365, Surfynol 104E (Air Products), Surfynol GA (Air Products), Wet KL 245 (Tego-Degussa Goldschmidt), Novel TDA 30, and EFKA-4580 (EFKA-Ciba Specialty Chemicals). Preferably, the concentration of the surfactant/substrate wetting agent in a net or overall formulation ranges from approximately 0.1 percent by weight to approximately 20 percent by weight, and more preferably ranges from approximately 0.1 percent by weight to approximately 5 percent by weight, and yet more preferably ranges from approximately 0.2 percent by weight to approximately 2 percent by weight—depending upon the type of cationic-stabilized dispersion.

Rheology modifiers for use in accordance with the present invention preferably include, for example, Borchigel PW25 (Lanxess Corporation), Alcogum L 520 (AkzoNobel), Aerosil 200 (Degussa), Rheolate 255 (Elementis Specialties), Borchigel PW25 (Lanxess Corporation) and SN-Thickener 612 NC (San Nopco Korea Ltd.). Preferably, the concentration of the rheology modifier in a net or overall formulation ranges from approximately 0.1 percent by weight to approximately 20 percent by weight, and more preferably ranges from approximately 0.5 percent by weight to approximately 10 percent by weight, and yet more preferably ranges from approximately 0.5 percent by weight to approximately 5 percent by weight—depending upon the type of cationic-stabilized dispersion.

PH modifiers for use in accordance with the present invention preferably include, for example, Formic Acid, as well as other strong and weak acids. Preferably, the concentration of the pH modifier in a net or overall formulation ranges from approximately 0.1 percent by weight to approximately 20 percent by weight, and more preferably ranges from approximately 0.5 percent by weight to approximately 10 percent by weight, and yet more preferably ranges from approximately 0.5 percent by weight to approximately 5 percent by weight—depending upon the type of cationic-stabilized dispersion.

Matting agents for use in accordance with the present invention preferably include, for example, Acematt TS100 silica and Syloid 55. Preferably, the concentration of the matting agent in a net or overall formulation ranges from approximately 0.1 percent by weight to approximately 20 percent by weight, and more preferably ranges from approximately 0.5 percent by weight to approximately 10 percent by weight, and yet more preferably ranges from approximately 0.5 percent by weight to approximately 5 percent by weight—depending upon the type of cationic-stabilized dispersion.

Defoaming agents for use in accordance with the present invention preferably include, for example, Agitan 299 (Ultra Additives), Byk-024 (BYK-Chemie) polysiloxane, Byk-025 (BYK-Chemie), and Surfynol 104 BK (Air Products). Preferably, the concentration of the defoaming agent in a net or overall formulation ranges from approximately 0.1 percent by weight to approximately 20 percent by weight, and more preferably ranges from approximately 0.5 percent by weight to approximately 10 percent by weight, and yet more preferably ranges from approximately 0.5 percent by weight to approximately 5 percent by weight—depending upon the type of cationic-stabilized dispersion.

Lubricity modifiers/taber additives for use in accordance with the present invention preferably include, for example, include Fluoroslip 511 (Shamrock Technologies, Inc.), Rosilk 2229, and Microspersion 190. Preferably, the concentration of the lubricity modifier/taber additive in a net or overall formulation ranges from approximately 0.1 percent by weight to approximately 20 percent by weight, and more preferably ranges from approximately 0.5 percent by weight to approximately 10 percent by weight, and yet more preferably ranges from approximately 0.5 percent by weight to approximately 5 percent by weight—depending upon the type of cationic-stabilized dispersion.

Fillers for use in accordance with the present invention preferably include, for example, Sachtleben Micro (Sachtleben Corporation), Huber 70 C (Huber Engineered Materials), and Steabright (Luzenac America). Preferably, the concentration of the filler in a net or overall formulation ranges from approximately 0.1 percent by weight to approximately 20 percent by weight, and more preferably ranges from approximately 0.5 percent by weight to approximately 10 percent by weight, and yet more preferably ranges from approximately 0.5 percent by weight to approximately 5 percent by weight—depending upon the type of cationic-stabilized dispersion.

Other compounds suitable for use in accordance with the present invention preferably include, for example, Z-6040 (Dow Corning) which is epoxy silane that crosslinks with KX-99 at room temp.

In one embodiment of the present invention, the process for fabricating the in-mold coated article comprises first applying a mold release agent to at least a portion of a tool surface. It will be understood that applying the mold release agent to the tool is optional. It will be further understood that any one of a number of conventional mold release agents are suitable for use with the present invention. Next, one or more of the cationic-stabilized dispersions disclosed herein is associated with at least a portion of the tool surface and/or the mold release agent. Finally, a substrate is associated with the tool surface having the optional mold release agent and the cationic-stabilized dispersion to, in turn, generate an in-mold coated article.

The invention is further described by the following examples.

Example 1

| Material | Amount (Wt. %) |
| --- | --- |
| Hydran CP-7050 | 60-95% |
| Lanco Liquimatt 6035 | 1-25% |
| Surfynol 104BC | 0.1-15% |
| SN-Thickener 612 | 0.1-15% |

Example 2

Part A

| Material | Amount (Wt. %) |
| --- | --- |
| Ottopol KX-99 | 47-96% |
| Syloid 75X5500 | 0.5-17% |
| Michem Glide 37 | 0.5-15% |
| Deionized Water | 1-20% |
| Byk 024 | 0.1-7% |
| Surfynol 104BC | 0.1-10% |
| SN-Thickener 612 | 0.1-15% |

Part B

| Material | Amount (Wt. %) |
| --- | --- |
| Bayhydur LS2306 | 50-95% |
| Butyl Acetate | 10-50% |

Part A is mixed with Part B at a ratio of approximately 8:1.

Part C

| Material | Amount (Wt. %) |
| --- | --- |
| Dow Corning Z-6040 | 50-95% |
| Butyl Acetate | 10-50% |

Part A is mixed with Part C at a ratio of approximately 6:1.

Additional formularies are provided in Examples 3-8 below.

Example 3

| Material | Amount (Wt. %) |
| --- | --- |
| Ottopol KX-99 | 50-95% |
| 90% Formic Acid (aq.) | 0.1-5% |
| Deionized Water | 1-25% |
| Byk 024 | 0.1-5% |
| Fluoroslip 511 | 0.5-10% |
| Acematt TS100 | 0.5-10% |
| Propylene Glycol n-butyl ether | 0.5-10% |
| Deionized Water | 1-25% |

-continued

| Material | Amount (Wt. %) |
| --- | --- |
| Byk 348 | 0.1-5% |
| SN-Thickener 612 | 0.1-5% |

Preferably the ratio (by weight) of the cationic-component to the solvent/co-solvent ranges from approximately 12:1 to approximately 5:1, and preferably the ratio (by weight) of the cationic-component to the lubricity modifier/taber additive ranges from approximately 95:1 to approximately 50:1.

Example 4

| Material | Amount (Wt. %) |
| --- | --- |
| Hydran CP-7050 | 50-98% |
| Byk 024 | 0.1-5% |
| Syloid 55 | 1-25% |
| Microspersion 190 | 1-25% |
| Surfynol 104BC | 0.1-5% |

Preferably the ratio (by weight) of the cationic-component to the lubricity modifier/taber additive ranges from approximately 95:1 to approximately 30:1.

Example 5

| Material | Amount (Wt. %) |
| --- | --- |
| Jeffamine T-5000 | 5-50% |
| 90% Formic Acid (aq.) | 0.1-10% |
| Deionized Water | 40-95% |
| Fluoroslip 511 | 0.1-5% |

Preferably the ratio (by weight) of the cationic-component to the solvent/co-solvent ranges from approximately 0.2:1 to approximately 1.5:1, and preferably the ratio (by weight) of the cationic-component to the lubricity modifier/taber additive ranges from approximately 30:1 to approximately 5:1.

Example 6

| Material | Amount (Wt. %) |
| --- | --- |
| Priamine 1074 | 5-50% |
| 90% Formic Acid (aq.) | 0.1-10% |
| Deionized Water | 40-95% |
| Byk 024 | 0.1-5% |

Example 7

| Material | Amount (Wt. %) |
| --- | --- |
| Hypro 2000X173 ATB | 5-45% |
| Propylene Glycol monomethyl ether | 1-10% |
| Glycol Ether EB | 2-20% |
| Surfactol 365 | 0.1-5% |
| Alcogum L-520 | 0.1-5% |

-continued

| Material | Amount (Wt. %) |
| --- | --- |
| 90% Formic Acid (aq.) | 0.1-10% |
| Deionized Water | 35-75% |

Example 8

| Material | Amount (Wt. %) |
| --- | --- |
| 90% Formic Acid (aq.) | 0.1-10% |
| Deionized Water | 40-80% |
| Baxxodur EC 311 | 2-23% |
| Triethylenetetramine (TETA) | 0.1-5% |
| Kuraray P-1010 | 1-15% |
| Novel TDA 30 | 0.1-5% |
| Ottopol KX-99 | 2-27% |
| Adipic Dihydrazide | 0.1-5% |
| Byk 024 | 0.1-5% |
| Fluoroslip 511 | 0.5-10% |
| Byk 348 | 0.1-5% |
| Reaxis C319 | 0.1-5% |
| Proglyme | 0.1-5% |
| Rosilk 2229 | 0.1-5% |

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed and desired to be secured by Letters Patent of the United States is:

1. A cationic-stabilized dispersion for use in fabricating an in-mold coated article, comprising:
a cationic-stabilized polyetheramine dispersion, wherein the cationic-stabilized polyetheramine dispersion comprises the structure of formula III:

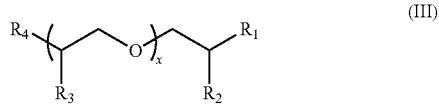

wherein $R_1$-$R_4$ are each independently selected from the group consisting of H, an amine, an ammonium constituent, and an alkyl, cycloalkyl, polycycloalkyl, heterocycloalkyl, aryl, alkaryl, aralkyl, alkoxy, alkanoyl, aroyl, and/or alkyl-alkenyl group containing approximately 1 to approximately 25 carbon atom(s); with the proviso that at least two of $R_1$-$R_4$ consist of an amine or an ammonium constituent and at least one of $R_1$-$R_4$ consists of an ammonium constituent under acidic conditions, and wherein x ranges from approximately 5 to approximately 70, and wherein the cationic-stabilized polyetheramine dispersion comprises a total amine concentration of approximately 0.40 meq/g to approximately 0.98 meq/g.

2. The cationic-stabilized dispersion according to claim 1, wherein the cationic-stabilized dispersion comprises at least one of a tri-functional primary amine, a di-functional primary amine, and a di-functional secondary amine.

3. A cationic-stabilized dispersion for use in fabricating an in-mold coated article, comprising:

a cationic-stabilized polyetheramine dispersion, wherein the cationic-stabilized polyetheramine dispersion comprises the structure of formula III:

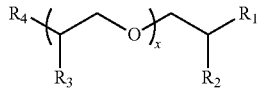

(III)

wherein $R_1$-$R_4$ are each independently selected from the group consisting of H, an amine, an ammonium constituent, and an alkyl, cycloalkyl, polycycloalkyl, heterocycloalkyl, aryl, alkaryl, aralkyl, alkoxy, alkanoyl, aroyl, and/or alkylalkenyl group containing 1 to 25 carbon atom(s); with the proviso that at least one of $R_1$-$R_4$ consists of an amine or an ammonium constituent and at least one of $R_1$-$R_4$ consists of an ammonium constituent under acidic conditions, and wherein x ranges from 5 to 70, and wherein the cationic-stabilized polyetheramine dispersion comprises a total amine concentration of approximately 0.40 meq/g to approximately 0.98 meq/g.

4. The cationic-stabilized dispersion according to claim 3, wherein the cationic-stabilized dispersion comprises at least one of a tri-functional primary amine, a di-functional primary amine, and a di-functional secondary amine.

5. A cationic-stabilized dispersion for use in fabricating an in-mold coated article, comprising:
a cationic-stabilized polyetheramine dispersion, wherein the cationic-stabilized polyetheramine dispersion comprises the structure of formula III:

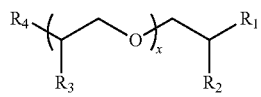

(III)

wherein $R_1$-$R_4$ are each independently selected from the group consisting of H, an amine, an ammonium constituent, and an alkyl, cycloalkyl, polycycloalkyl, heterocycloalkyl, aryl, alkaryl, aralkyl, alkoxy, alkanoyl, aroyl, and/or alkylalkenyl group containing 1 to 25 carbon atom(s); with the proviso that at least two of $R_1$-$R_4$ consist of an amine or an ammonium constituent and at least two of $R_1$-$R_4$ consists of an ammonium constituent under acidic conditions, and wherein x ranges from 5 to 70, and wherein the cationic-stabilized polyetheramine dispersion comprises a total amine concentration of approximately 0.40 meq/g to approximately 0.98 meq/g.

6. The cationic-stabilized dispersion according to claim 5, wherein the cationic-stabilized dispersion comprises at least one of a tri-functional primary amine, a di-functional primary amine, and a di-functional secondary amine.

* * * * *